United States Patent Office 3,359,253
Patented Dec. 19, 1967

3,359,253
CHROMIUM-CONTAINING AZO DYESTUFF
Walter Biedermann and Eginhard Steiner, Basel, Switzerland, assignors to J. R. Geigy A.G., Basel, Switzerland
No Drawing. Filed Dec. 16, 1964, Ser. No. 418,868
1 Claim. (Cl. 260—145)

ABSTRACT OF THE DISCLOSURE

A dyestuff which in the free acid state is of the formula

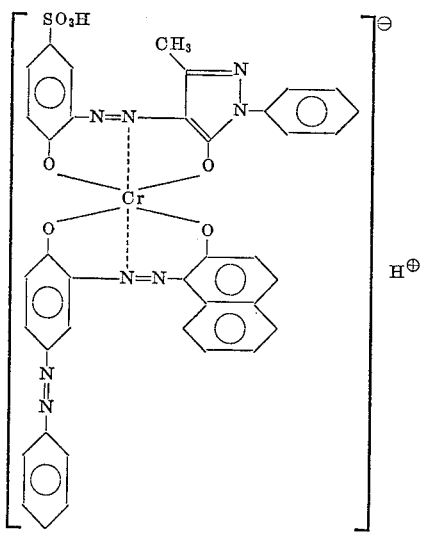

possesses excellent fastness properties.

---

The invention concerns a chromium-containing azo dyestuff which contains a mono and a disazo dyestuff bonded co-ordinatively to a hexavalent chromium atom. It also concerns a process for the production of this dyestuff and its use for the dyeing of natural and synthetic polyamide fiber materials such as wool, silk, leather, furs, nylons and the like, and also of superpolyurethane fibers.

The novel dyestuff according to the invention is, in its free acid form, of the formula

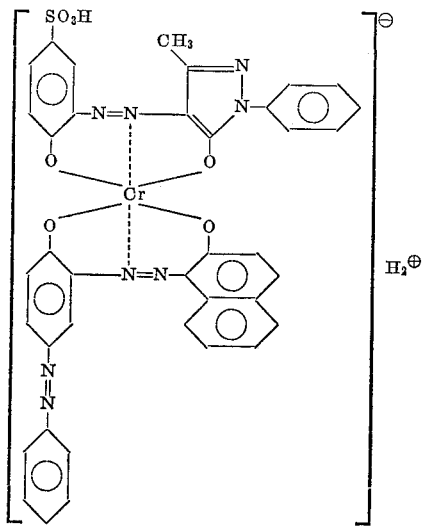

and dyes the aforementioned fiber materials in brown shades which have very good all-round fastness properties.

Particularly surprising is the fastness of dyeings obtained on a first component fiber of a blended textile fiber material such as nylon-wool blends, when such blends are cross dyed or filled up or over-dyed from another dyebath of a different, in particular of a considerably lower pH than had been used in the first bath.

The dyestuff of the invention also reserves cellulose triacetate, polyethylene glycol terephthalate (Terylene), polyacrylonitrile containing from 2 to 10% of a vinyl pyridine copolymer (Orlon 42) and viscose rayon very well, while structurally most closely related known compounds show insufficient reserve. The fastness of dyeings of the dyestuff according to the invention on wool, silk and nylons to washing, alkaline milling, rubbing and perspiration are also highly satisfactory, and unexpectedly superior to those known dyestuffs which are structurally closest to the new dyestuff.

The dyestuff according to the invention is prepared in the following manner:

36.8 parts of the dyestuff from diazotized 3-amino-4-hydroxyazobenzene and 2-hydroxynaphthalene are slurried in 950 parts of water, 0.5 part of a sulfonated castor oil and 12 parts of sodium hydroxide and the slurry is heated to 95–100°. The amount of complex chromium compound of the type 1 chromium atom to 1 dyestuff molecule, corresponding to 5.2 parts of chromium and 37.4 parts of the dyestuff from diazotized 1-amino-2-hydroxybenzene-4-sulfonic acid and 1-phenyl-3-methylpyrazolone is then added.

After maintaining the temperature at 95–100° for 20 minutes, it is reduced to 80° and 275 parts of sodium chloride are added. The dyestuff thus precipitated is filtered off and washed with an 80°-hot aqueous 25%-sodium chloride solution until the filtrate is almost colorless. The dried dyestuff is a brown powder. It dyes wool, synthetic polyamide, silk and leather in brown shades which have the above-described very good fastness properties.

We claim:
The chromium complex dyestuff which in its free acid form is of the formula

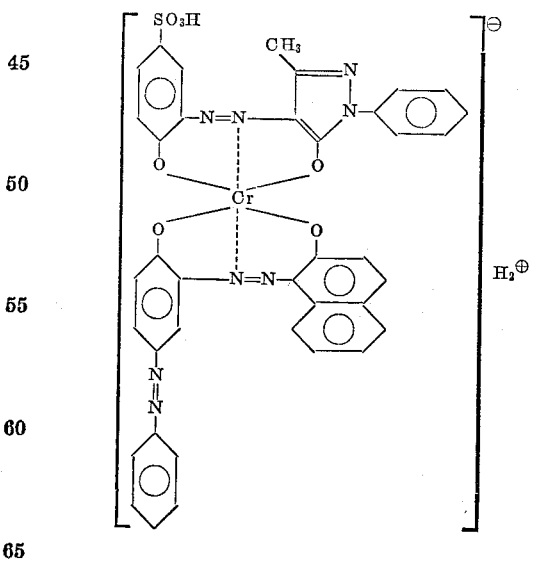

References Cited
UNITED STATES PATENTS
2,933,488  4/1960  Biedermann et al. ____ 260—145

CHARLES B. PARKER, Primary Examiner.
FLOYD D. HIGEL, Examiner.